United States Patent
Pearson et al.

(10) Patent No.: US 9,223,781 B2
(45) Date of Patent: Dec. 29, 2015

(54) METHOD AND APPARATUS FOR AUTOMATIC EDITING

(71) Applicant: VYCLONE, INC., Hollywood, CA (US)

(72) Inventors: James Pearson, Hammersmith London (GB); David King Lassman, Los Angeles, CA (US); Joseph Sumner, Venice, CA (US); Markus Iseli, Los Angeles, CA (US); David Harvey, London (GB)

(73) Assignee: Vyclone, Inc., Venice, CA (US)

( * ) Notice: Subject to any disclaimer, the term of this patent is extended or adjusted under 35 U.S.C. 154(b) by 0 days.

(21) Appl. No.: 14/098,206

(22) Filed: Dec. 5, 2013

(65) Prior Publication Data

US 2014/0153902 A1  Jun. 5, 2014

Related U.S. Application Data

(60) Provisional application No. 61/733,857, filed on Dec. 5, 2012.

(51) Int. Cl.

| | |
|---|---|
| *G11B 27/00* | (2006.01) |
| *G06F 17/30* | (2006.01) |
| *G11B 27/031* | (2006.01) |
| *G11B 27/28* | (2006.01) |
| *H04N 21/2743* | (2011.01) |
| *H04N 21/45* | (2011.01) |
| *H04N 21/854* | (2011.01) |

(52) U.S. Cl.
CPC .............. *G06F 17/30* (2013.01); *G11B 27/031* (2013.01); *G11B 27/28* (2013.01); *H04N 21/2743* (2013.01); *H04N 21/4532* (2013.01); *H04N 21/854* (2013.01)

(58) Field of Classification Search
CPC ....................................................... G11B 27/34
USPC .................. 386/239, 248, 278, 281; 348/700; 382/165
See application file for complete search history.

(56) References Cited

U.S. PATENT DOCUMENTS

| | | | |
|---|---|---|---|
| 2007/0263128 A1* | 11/2007 | Zhang ............................ | 348/700 |
| 2008/0019661 A1* | 1/2008 | Obrador et al. .................. | 386/52 |
| 2011/0007968 A1* | 1/2011 | Yamada ........................ | 382/165 |

OTHER PUBLICATIONS

International Search Report and Written Opinion dated May 16, 2014 regarding PCT/US2013/073422.

* cited by examiner

*Primary Examiner* — Thai Tran
*Assistant Examiner* — Mishawn Hunter
(74) *Attorney, Agent, or Firm* — Arent Fox LLP (57) ABSTRACT

The system provides for the automatic editing of a video comprised of a plurality of content segments. When two or more content clips are available at a particular moment in time, the system will automatically choose at least a portion of one of the clips pursuant to preference metrics determined by a user. The system contemplates the ability of the user to define specific metrics to control the editing, including frequency of edits, content of content clip, level of activity, and the like. In another embodiment, the system has a plurality of pre-defined editing modes that define various metrics for use in the automatic editing system, including guaranteed participation, speaker-centric, quality of clip, and the like.

12 Claims, 10 Drawing Sheets

METHOD AND APPARATUS FOR AUTOMATIC EDITING

This patent application claims priority to U.S. Provisional Patent Application No. 61/733,857 filed on Dec. 5, 2012 which is incorporated by reference herein in its entirety.

BACKGROUND

There are a number of situations where a number of people are having a shared experience and it would be desirable to have a video record of the experience. In the current art, this would involve one or more of the participants recording the experience, such as with a video camera or a smart-phone or some other mobile device.

The person making the recording might then forward the video to others via email or a social media website, twitter, YouTube, or the like. If two or more people made recordings, the different recordings might also be shared in the same manner.

Sometimes there may not be any single content file that encompasses the entire event. In that situation it may be desired to stitch together two or more content files to create a single file that provides a more complete recorded version of the event.

Such a combining of content files involves the ability to assign a given content file its proper location in space and time. In the prior art this is sometimes accomplished by using other content files to help in defining a timeline on which each content file may be placed. Provided with multiple content files, such as video/audio recordings, it is possible to group and assign recordings to events, and find the sequence and overlap of each of the recordings within an event.

At a particular moment in time, if there are two or more content files that are available, it is useful to have a system in place that allows a user to choose which file to use for that moment. Typically this is a manual process known as "editing" and has been in use in the motion picture and television industry for many years. In some cases, it involves the physical cutting a splicing of film strip segments into an integrated whole. In other cases, content segments are selected digitally and integrated in a processing system.

SUMMARY

The system provides for the automatic editing of a video comprised of a plurality of content segments. When two or more content clips are available at a particular moment in time, the system will automatically choose at least a portion of one of the clips pursuant to preference metrics determined by a user. The system contemplates the ability of the user to define specific metrics to control the editing, including frequency of edits, content of content clip, level of activity, and the like. In another embodiment, the system has a plurality of pre-defined editing modes that define various metrics for use in the automatic editing system, including guaranteed participation, speaker-centric, quality of clip, and the like.

DETAILED DESCRIPTION OF THE SYSTEM

The system provides the ability to automatically select cut points and edit points in assembling a video from a plurality of video clips. The video clips can be from the same event and recorded, for example, by cell phones or other cameras. One such system is described in U.S. patent application Ser. No. 13/445,865 filed on Apr. 12, 2012 entitled "Method and Apparatus for Providing Content from a Plurality of Sources" published as 2012/0263439 on Oct. 18, 2012 and incorporated by reference herein in its entirety.

We first describe the collection and synchronization of content clips and then describe the method of automatic editing.

Content Clip Collection

Initially, a plurality of content clips that are related to a specific event are collected. The content clips may be recorded by a plurality of cell phones, for example, and may be continuous or intermittent, and are typically taken from different angles due to the positions of the users holding the cell phones being in different locations. The clips may be of varying resolution, and may or may not include metadata associated with the clip.

The following is by way of example and other method of collecting and synchronizing clips may be used without departing from the scope and spirit of the system.

Figure 7:
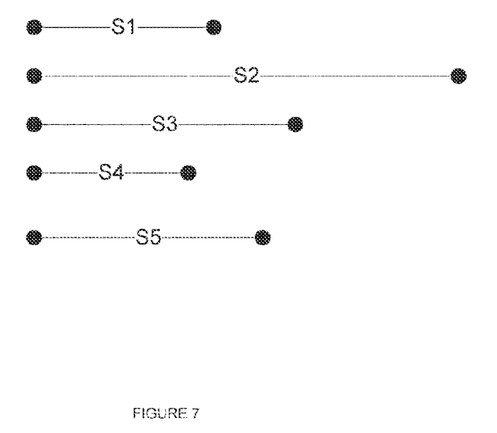
FIG. 7 illustrates an example of five content samples received by the system.

FIG. 7 illustrates a plurality of content files that may be received by the system. As each of a plurality of content files is received by the system, it is identified, collected, and associated with an event. An event is a collection of content files that relate to the same thing and are related in some way. In the example shown, there are five content files, S1-S5.

Figures 1, 2:
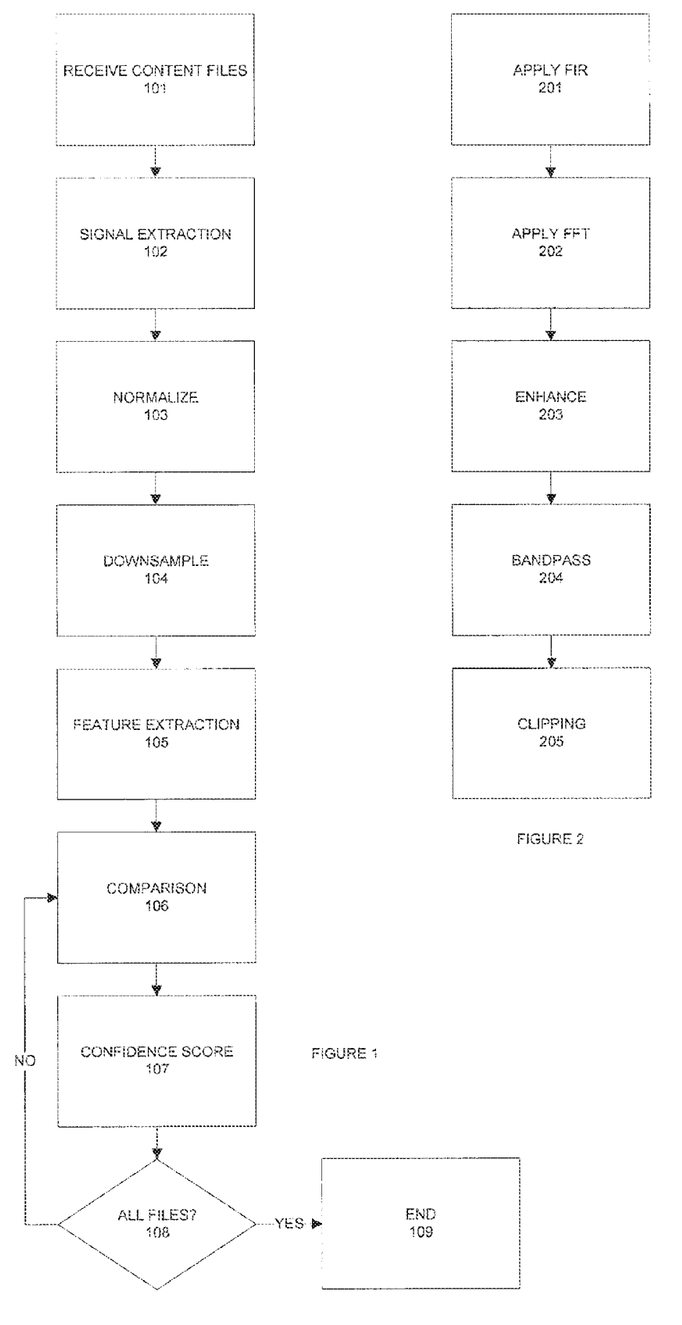
FIG. 1 is a flow diagram of an embodiment of the operation of the system.
FIG. 2 is a flow diagram illustrating feature extraction in one embodiment of the system.

FIG. 1 is a flow diagram illustrating the operation of an embodiment of the system. At step 101 the system receives a plurality of content files. These files are determined to be related to an event and are from approximately the same time.

It is possible that the timing of the files overlaps or that some files are independent in time (i.e. do not overlap) from one or more other files. It is possible to assemble the files on a time line so that over some time period from time $T_0$ to $T_n$, there is at least one content file that is present for each time $T_k$ in the time line.

At step 102 the system performs signal extraction on each content file. That is the splitting of the audio track from the video file using some technique. In one embodiment, the system may use a tool such as FFmpeg. At step 103 the system normalizes the audio track, converting it from its source format to some other desired format so that the various audio tracks may be manipulated consistently. In one embodiment, the system converts each audio track to a .wav file format.

At step 104 the system downsamples the .wav file to a consistent sampling and bit rate, e.g. 8 kHz and 16 bit samples. At step 105 the system performs feature extraction. In one embodiment this includes generating a spectrogram of the audio signal.

At step 106 the system performs a comparison of each audio file to every other audio file in the event set to determine where in the time line the file is in relation to other files. At step 107 the system assigns a confidence score to the results of the comparison, representing the likelihood that a match of two files as having at least some common audio is correct.

At step 108 the system determines if all files have been compared. If not, the system returns to step 106. If so, the system ends at step 109.

Feature Extraction

FIG. 2 is a flow diagram illustrating feature extraction in one embodiment of the system. This is applied on a frame by frame basis of the audio signal in one embodiment of the system. At step 201 the system applies a filter (e.g. a finite impulse response FIR filter) to the audio signal. This is a first order finite impulse response (FIR) filter which enhances high frequencies. A goal is to maximize (or at least not reduce) the spectral discrimination between different signals.

At step 202 the system calculates a spectrogram using a 64-point real short-term Fast Fourier Transform (FFT) with 10 ms (milliseconds) frame duration and 10 ms frame shifts, resulting in no frame overlap and a frequency resolution of 125 Hz (Hertz). This step includes Hamming filtering of the frames.

At step 203 the system enhances the signal. This is accomplished in one embodiment by taking the absolute value of each complex frequency component and then subtracting three quarters of the mean of each frame. This step enhances the spectral peaks by removing lower-energy spectral components: For frames with background noise, the mean of the noise is removed. For frames with noise plus signal the noise is removed. For frames with signal only, weaker signal (non-landmark) components are removed.

At step 204 the system disregards the first and last five frequency bins out of the FFT array. This results in removal of frequency components below 600 Hz and above 3400 Hz. At step 205 a clipping operation is performed by clipping the spectral amplitude at 1.0 and taking the logarithm. This step reduces the dynamic range of the signal and mimics the human auditory system. The result, for each frame, is a spectrogram that is stored in an array.

Comparison

Figure 3:
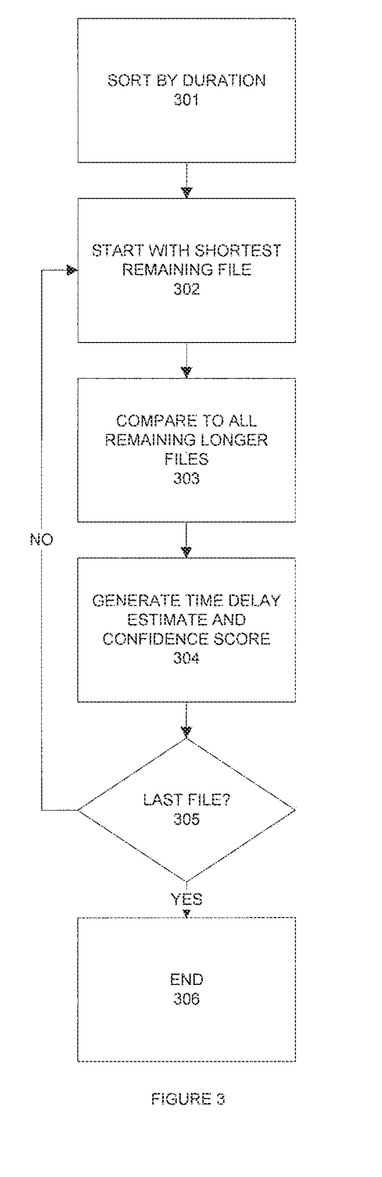
FIG. 3 is a flow diagram illustrating the comparison step in one embodiment of the system.

FIG. 3 is a flow diagram illustrating the comparison step in one embodiment of the system. At step 301, the features of the audio files are sorted by duration. Example: Assume the audio files, F1, F2, and F3, with their corresponding features X1, X2, X3 are sorted by duration, d( ), as $d(F1)<=d(F2)<=d(F3)$ with F having the shortest duration. The features are sorted as [X1, X2, X3].

Figure 8:
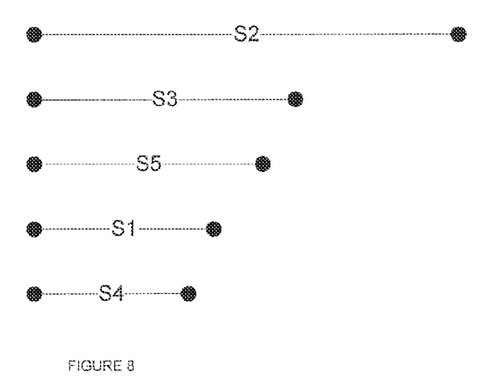
FIG. 8 illustrates the ordering of the content samples in an embodiment of the system.

This sorting can be shown graphically in FIG. 8 where the shortest file, S4, is followed by (in order of increasing duration) file S1, S5, S3, and S5.

At step 302, starting with the shortest remaining file, the features of the shortest audio file are then compared to the features of all audio files with longer duration at step 303. Example: Given $d(F)<=d(F2)<=d(F3)$, we compare(X1,X2) and compare(X1,X3).

Referring again to FIG. 8, this means that file S4 would be compared to files S1, S5, S3, and S2. File S1 would only be compared to longer duration files S5, S3, and S2. File S5 is compared to file S3 and S2, and file S3 is compared to file S2.

At step 304, the system generates a time delay estimate for each comparison of the sample point with the longer remaining files. Each comparison between two files returns a time-delay estimate, resolution 10 ms, together with a confidence score that ranges between zero and one, one representing highest confidence in the time-delay estimate and zero meaning no confidence. Example: compare(X1,X2)=[120 ms, 0.6], which would indicate that X2 starts 120 ms after X1 starts, with a confidence score of 0.6 and compare(X2,X3)= [−120 ms, 0.2], which would indicate that X3 starts 120 ms before X1 starts, with a confidence score of 0.2.

At decision block 305, the system determines if there are any more files to compare. If not, the system ends at step 306. If so, the system returns to step 302 and the features of the next shortest duration audio file are compared to the features of all audio files with longer duration. Example: Given $d(F1)<=d(F2)<=d(F3)$, compare(X2,X3). This process is repeated until all audio file features have been compared. Given N files, this will require N choose 2 or $N!/(N-2)!/2$ comparisons.

Feature Comparison

Figure 4:
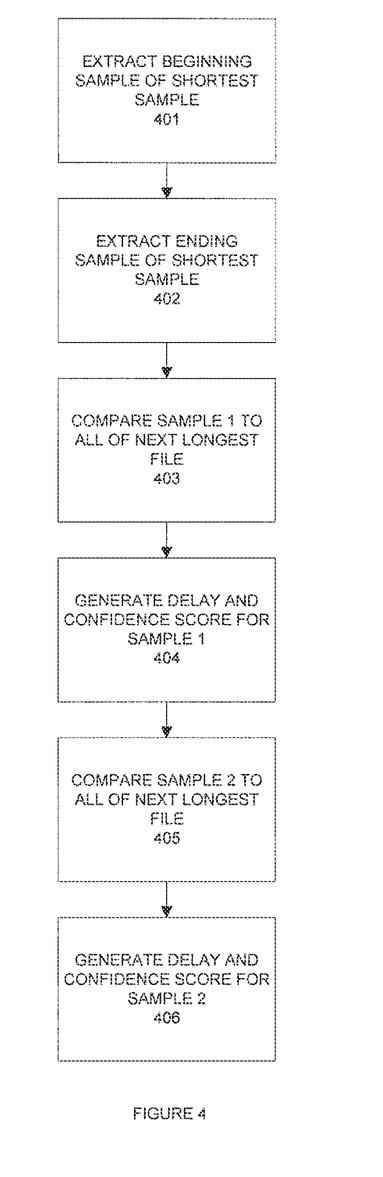
FIG. 4 is a flow diagram illustrating feature comparison in one embodiment of the system.

The feature comparison step is described in connection with the flow diagram of FIG. 4. In order to increase the efficiency of the feature comparison process which calculates time-delay and confidence score, the algorithm compares only the first few seconds from the start and the end of the shorter duration signal to the longer duration signal. In one embodiment the system uses 2 second samples. Using short-duration beginning and end segments for comparison has two benefits: a) it reduces the computational load from order of duration squared, $O(d^2)$, to approximately linear, $O(d)$, and b) it allows for negative and non-complete overlaps of audio signals. Example: Assume that X1b represents the features of the first q seconds of X1, the beginning of X1, and X1e represents the spectral features of the last q seconds of X1, the end of X1.

Then we compare(X1b,X2) and compare(X1e,X2). Given two audio files F1 and F2, where F1 starts at least q seconds before F2 ends and ends at least q seconds after F2 ends, with $d(F1)<=d(F2)$. compare(X1,X2) and compare(X1e,X2) will yield respectively, a time-delay with low-confidence since there is no complete overlap, whereas compare(X1b,X2) will yield a time-delay with high confidence since there is complete overlap.

At step 401 the system extracts Sample 1, the beginning q seconds of the shortest sample and at step 402 extracts Sample 2, the ending q seconds of the shortest sample. At step 403 the system compares Sample 1 to the entirety of the next longest file and generates a time delay and confidence score at step 404. At step 405 the system compares Sample 2 to the entirety of the next longest file and generates a time delay and confidence score at step 406. In one embodiment, if there is a high level confidence score for Sample 1, above some predetermined threshold, the system can optimize the comparison step by beginning the Sample 2 comparison at the high confidence point, since we can assume that any synchronization point of Sample 2 must occur sometime after the synchronization point of Sample 1.

Note that in some approaches, correlation between two time-signals x(t) and y(t) is done in the frequency domain by addition of the corresponding log-spectra log X(f) and log Y(f). By contrast, this system calculates the absolute difference between the log-spectra features (described above under feature extraction) of each frame resulting in an optimum of zero difference if the frames have equal spectrograms. Compared to other methods, this method has the clear benefit of introducing an optimum lower bound at zero so that all results can be interpreted relative to this optimum and a confidence score can be calculated.

Figure 5:
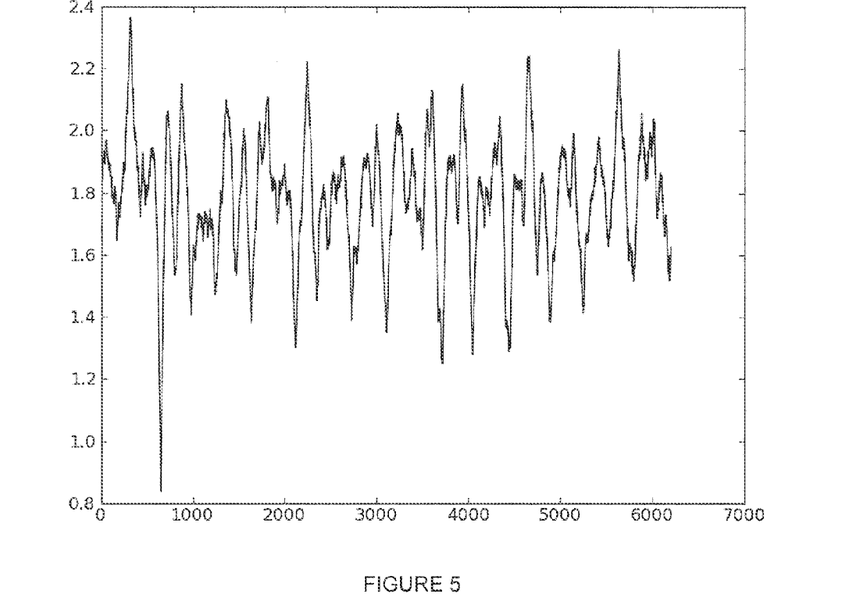
FIG. 5 is a graph illustrating time delay in an embodiment of the system.

Each frame comparison yields a two-dimensional spectrogram-like feature difference that is then reduced to a scalar value by taking its mean over time and over frequency dimensions. Since time-delay between two signals determines which of their feature frames will be compared, a scalar feature difference can be calculated for each time-delay value resulting in a graph that shows the time-delay on the abscissa and the scalar feature difference on the ordinate. The minimum value will indicate the time-delay. FIG. 5 illustrates an example of such a graph. It can be seen that the minimum scalar feature difference is about 0.84 at time 6.55 s (655*10 ms), which corresponds to an estimate of the optimal time-delay.

Confidence Score

Figure 6:
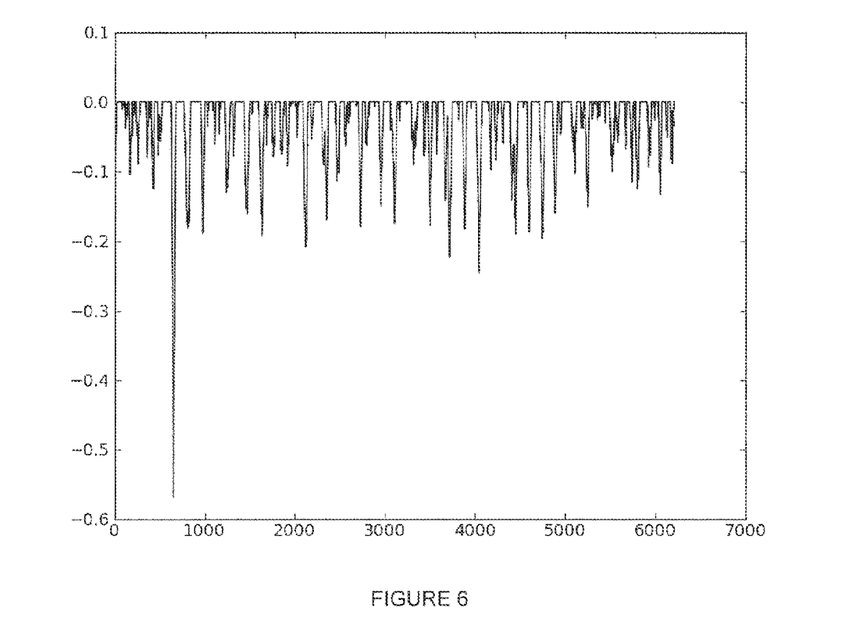
FIG. 6 is a graph illustrating confidence score in an embodiment of the system.

In order to compute a reliable confidence score the above scalar feature difference graph of FIG. 5 is high-pass filtered to accentuate the negative peaks. Additionally the mean is removed. FIG. 6 is an example graph that shows the results of these operations on the signal of FIG. 5. The minimum peak is now at −0.569 (MIN1) with its time location unchanged at 6.55 s. Once the location of the minimum peak has been determined, all consecutive non-zero values to the left and to the right of the peak are set to zero and the next minimum peak is detected. This next peak is located around time 40.45 s (4045*10 ms) and is at −0.246 (MIN2) in the example shown. The confidence score is calculated as the difference between the first and the second minimum peak values, normalized by the first minimum peak value, as (MIN1−MIN2)/MIN1. In this example: (−0.569−−0.246)/0.569=0.568.

Figure 9:
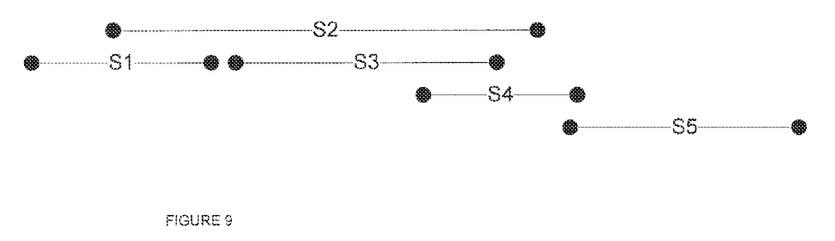
FIG. 9 illustrates the timeline created after application of the system.

As shown in FIG. 9, the content files have been sorted using the system and the files are arranged based on the confidence score generated in previous steps. This allows the relationship of the files in time to be revealed. For example, file S1 is the earliest content file in time and the end of file S1 overlaps partially with file S2. File S3 completely overlaps with file S2 and partially with file S4. File S4 has partial overlap (at its beginning) with file S2 and S3, and has partial overlap (at is end) with file S5. The system now has the ability to create, using all or some of each content file, a continuous (in time) file of an event from the earliest moment (beginning of file S1) to the latest moment (end of file S5). As can be seen, there are certain regions on the time line where the content from any of files S2, S3, and S4 could be used as the source of the content for that period of time. This choice may be automated as described below and/or manually determined by the user.

Automatic Editing

The system allows the use of a plurality of metrics and parameters to be used to automatically edit a collection of clips into a composite video. The selection of a portion of available content clips at any point in time is driven by the available content clip that best represents the desired metrics and parameters.

Quality Score Generation

In one embodiment, the system receives content clips and processes them to generate a quality score. The quality score is based on parameters and metrics that the user has determined are important for the generation of a composite clip. Each clip is from a particular recording device and so the system uses data from that device to assist in generating a quality score for the clip.

Figure 10:
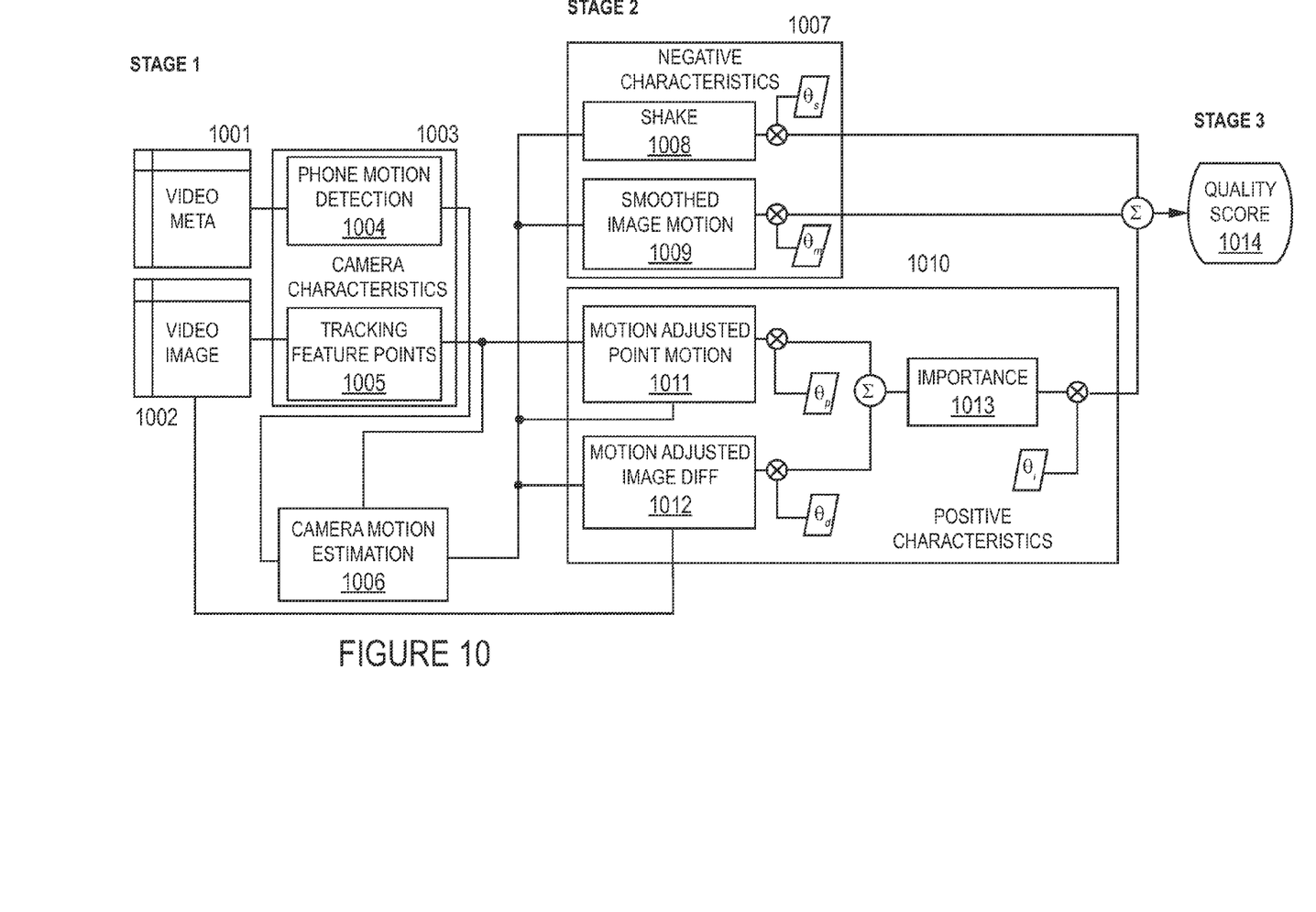
FIG. 10 illustrates an embodiment of the stages used in generating a quality tracking score.

The information available for each camera is the video stream and its associated metadata (where available). This is then used to estimate the global camera image motion. This can either be derived from the change in acceleration/compass etc. from the metadata or measured directly from the video. FIG. 10 illustrates an embodiment of the stages used in generating the quality tracking score, including Stage 1 (camera characteristics), Stage 2 (positive and negative characteristics) and Stage 3 (quality sum).

This information and data can be generated at the system level (e.g. using cloud computing) or at the camera/phone level as desired. In this embodiment, the video data is used to generate the quality score independently of the audio data. However, the system may be implemented in a manner that also utilizes audio data to contribute to the quality score.

Stage 1 Camera Characteristics

Referring to FIG. 10, Stage 1 comprises Video Metadata 1001 and Video Image 1002 received from a recording camera, Camera characteristics block 1003 including phone motion detection block 1004 and Feature tracking block 1005, as well as camera motion estimation block 1006.

The video metadata 1001 can include information about the content clip including resolution, time of day, any added time stamp information, geo-location information, accelerometer data, compass data, and the like. The metadata 1001 is provided as input to the Phone motion detection block 1004 of camera characteristics block 1003. The system uses the metadata to estimate the phone motion (assuming the user is using a cell phone for recording. The output of the phone motion detection block 1004 is provided as input to the camera motion estimation block 1006. Although the system is described in conjunction with a cell phone as the recording device, it should be understood that any suitable recording device may be used, including a tablet computer. PDA, video camera, Google Glass™, or any other device that can be used for recording video.

The system uses video image data 1002 as input to the feature tracking block 1005. This block uses video data to generate its own camera motion estimation data that is also provided to camera motion estimation block 1006. Camera motion estimation block 1006 uses the outputs of 1004 and 1005 to generate estimated camera motion data that is provided as input to Stage 2 of an embodiment of the system.

Video Point Tracking 1005

Figure 12:
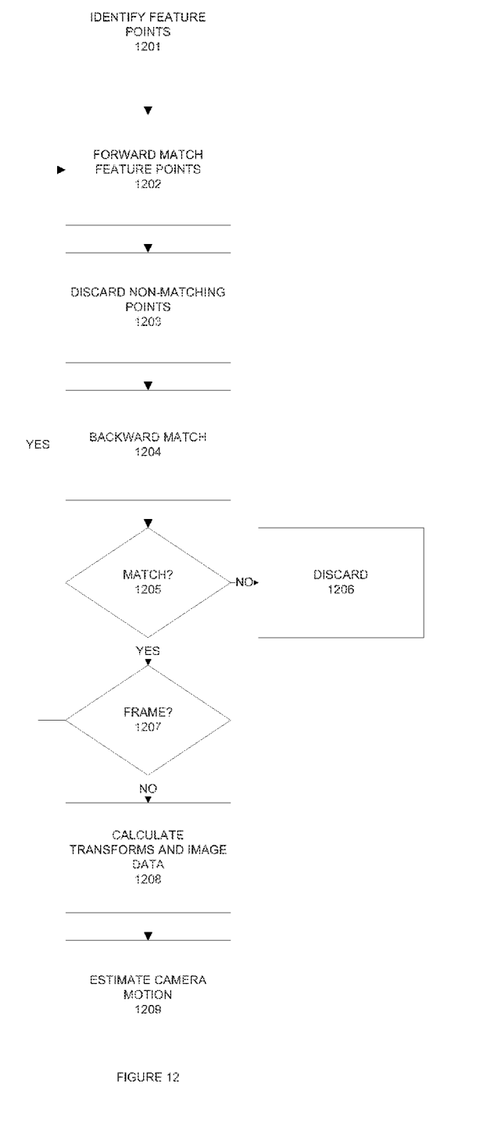
FIG. 12 is a flow diagram illustrating the operation of the feature tracking block in one embodiment of the system.

The operation of the feature tracking block 1005 in one embodiment is illustrated in the flow diagram of FIG. 12. At step 1201, feature tracking block 1005 identifies distinct, trackable feature points in an image frame ($I_n$) within the video. These points are then forward matched to the to the next image ($I_{(n+1)}$) at step 1202 using, for example, a modified cascading Lucas-Kanade algorithm. Any points without a sufficiently good match are discarded at step 1203.

The remaining points are projected backwards at step 1204 to check if the forward and backward prediction vectors are the same. At decision block 1205 it is determined if there is a backward match. Any that do not match to their originating point in $I_n$ at step 1205 are deemed unreliable and discarded at step 1206. The system increments to the next frame, if available, at step 1207 and returns to step 1202 and keeps tracking the same set of points between frames, refreshing the set with new points as necessary to keep a roughly constant number of tracked points, storing the tracking history for each point.

If there are no more frames at step 1207, the system collects the qualifying feature points. After removing outliers and using, for example, a small shift affine transform validity assumption, the system calculates the affine transform of the points to calculate the global X/Y shift, rotation, and scaling of the image at step 1208. Using the results of the point tracking and the metadata in block 1006 the system can make a reasonable estimate of the camera motion in terms of movement forward/backward (image scaling), panning (image motion) and rotations (image rotation 3D) at step 1209. This is reliable when the global motion between frames is small. In situations where there is large and/or chaotic motion, there may be a reduction in the number of tracked points, indicating a camera stream at this point is particularly bad. This stream should be assigned a large negative weight to avoid its inclusion in composite videos.

Stage 2 Negative and Positive Characteristics

The output of block 1006 is provided to the second stage to determine negative 1007 and positive 1010 characteristics. The system splits the camera motion into camera shake 1008 and global camera motion. The system then applies a low-pass FIR filter on the raw camera shifts to acquire the smoothed camera motion 1009 and applies a high pass FIR filter to acquire the camera shake 1008.

These outputs are considered to be negative characteristics so they are weighted negatively by summing with weights ($\theta_s$ and $\theta_m$). Note that camera motion is independent of shake. Shake may be present with or without motion and could cause some points to initially appear to be interesting due to perceived relative movement with respect to the camera motion. Sufficient shake may cause the interest score to be unreliable.

Using the camera motion estimate 1006 generated in FIG. 12, the system can predict the motion for all points within the scene (the previously calculated affine transform). Points that match the camera motion estimate are presumed to be due only to the camera motion. Any points or regions of the image that are do not match the estimated camera motion (i.e. not moving with the global motion) are assumed to be objects actually moving within the scene. Tracking points are motion adjusted by subtracting the appropriate global motion vector and then taking a running average over its point history. This removes the motion of background points and thereby reveals "interesting" objects that are truly moving within the scene. It should be noted that background motion can be adjusted to account for scene depth where it is available or can be calculated so that points that are further away do not necessarily appear as points of interest (because deeper points will appear to move more with camera motion).

The system also motion adjusts the feature points of an image frame $I_n$ 1011 and compares it with $I_{(n+1)}$ to find the motion adjusted differential 1012. These measurements are then weighted ($\theta_d$ and $\theta_p$) and summed to generate the importance measure 1013 for a frame. This value is weighted ($\theta_I$) and provided as an output of positive characteristic block 1010. In one embodiment, it is assumed that the larger the differential (e.g. the greater the motion between frames) the more interesting the object.

Stage 3 Quality Score Calculation

All the characteristics scores from 1007 and 1010 are summed to generate a quality measure 1014. In one embodiment a score of 0 is neutral and positive and negative scores indicate relative quality measurements of the image. The quality score can be used as a metric to determine which of two or more possible streams are chosen at a particular cut point. All observed traits of the video are given a positive or negative weighting. For example, shake could be given a negative weight of −1 and detecting a face could be given a weight of +10. These are then summed together to give the overall quality score.

In one embodiment the system analyses each frame of each stream. In alternate embodiments, the system analyses only certain frames (e.g. every third frame). In another embodiment, the system may first generate thumbnails of each frame and analyze the thumbnails. In other instances, only certain frames of the thumbnails (e.g. every third frame) are analysed.

Cut Point Generation

The system uses the quality score per analyzed frame and applies processing to define potential switching points (cut points or edit points) based on the overall parameters selected by the user. In one embodiment, the user may have selected from various predefined editing approaches such as sports, drama, concert, interview, and the like.

Figure 11:
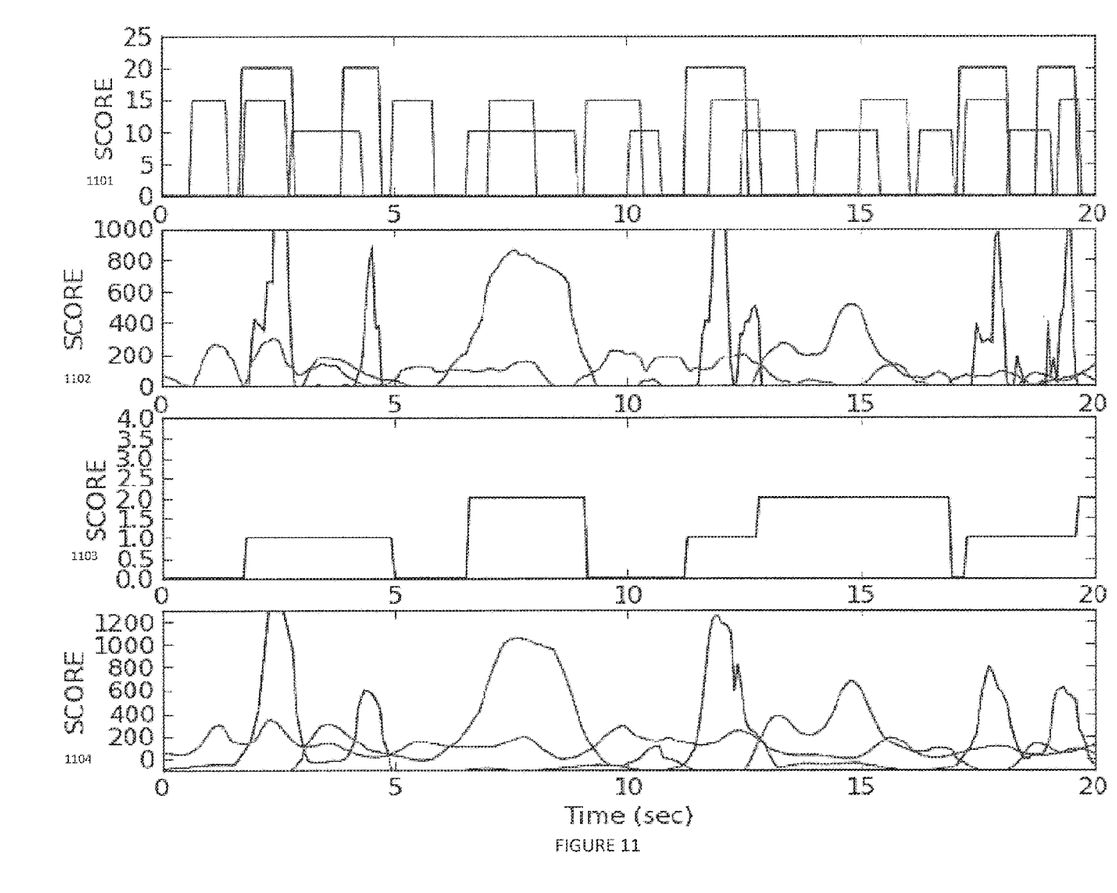
FIG. 11 illustrates a plurality of graphs representing quality scores after various processing steps of an embodiment of the system.

FIG. 11 illustrates a plurality of graphs representing quality scores after various processing steps of the system. Graph 1102 represents the quality score per frame (e.g. score vs time). In the example, there are three content streams represented by three lines. It can be seen that the image from the one camera source has a number of clear peaks of quality score interspersed with neutral or low quality score frames. Another camera is of relatively low quality score in general but has moments when it does have the highest quality score. The third camera has two time periods when it has a high quality score.

Graph 1101 represents "interesting" regions after applying an adaptive thresholding operation. It can be seen, by comparing to graph 1102, that the second camera has a higher interest score in those time periods in which it has the highest quality score, even though the quality score is relatively low in that time period.

Some of the processing applied to the quality score data includes applying a spike extraction filter that boosts sudden spikes in activity. The system also measures the global importance level of the streams relative to each other. This measure is then used to boost the most interesting parts of the least important streams to boost the chance that they get chosen in the editing process.

Using an adaptive thresholding algorithm the system identifies interesting regions as shown in 1101. The system may merge nearby regions to avoid jittery flicking between different sources. This allows the system to deal with circumstances where there is a thresholded result. If the quality score has a high mean and variance with a high frequency, there will be an unnecessary number of switching points in a short duration. By merging regions together this high frequency switching can be avoided.

In one embodiment the system adds a pre-buffer time to each region so the system can switch just before the event happens rather than exactly as it occurs. In one embodiment this buffer may be as little as two frames prior to the point at which the high interest point begins.

If there are large sections with no regions (several seconds) the system may re-scan the raw data with broader threshold values or use a flood select to find negative points to switch on (when a sequence starts getting worse) to give us the opportunity to avoid bad quality sections.

The beginning and end of each region of 1101 identifies a potential switching point in generating a composite video. However the system does not necessarily switch at each potential switching point.

Figure 13:
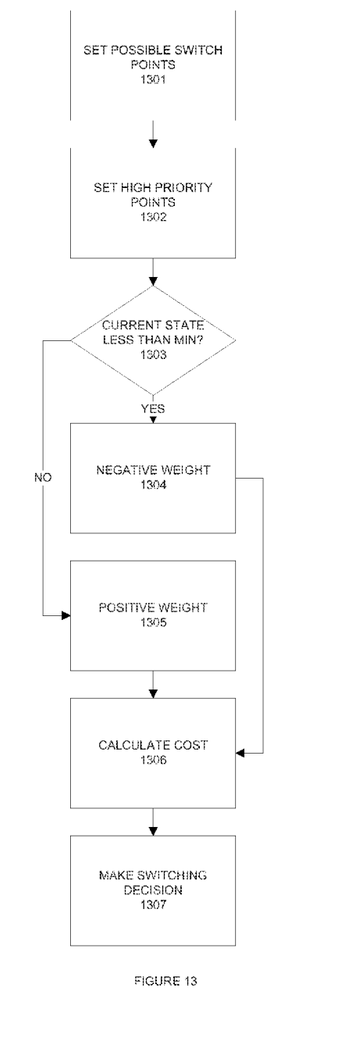
FIG. 13 is a flow diagram illustrating application of a cost function in an embodiment of the system.

To avoid unwanted switching the system uses a modified Viterbi style decoding algorithm to find the optimal path through by applying a costing function for each state transition, such as described in conjunction with the flow diagram of FIG. 13.

Each of the calculated region start/stop points of 1101 are set as possible switching points at step 1301. Points that correspond to high importance video or audio impacts are set as high priority switch points (for example the spikes in graphs 1102) at step 1302.

The Viterbi decoder is based on a series of costs for each decision and M states (one for each stream). At step 1303 the system determines if the current state has endured for less than a minimum time DELTA_MIN. The switching cost is based on the sum of quality score in the following segment (till the next potential switch point) following a switch with a high negative weight 1304 if the decoder has been in the current state for less than DELTA_MIN and a positive weight 1305 if it has been there longer than DELTA_MIN. This cost 1306 is included to include all the high importance regions but the switching period should not be significantly greater than or less than the MIN_DELTA. The system identifies a switch point at step 1307. An example switching profile is shown in graph 1103 of FIG. 11 showing the smooth and deliberate seeming switching.

By adjusting the cost for each high level parameter the system can control what sort of cut profile is generated. Some of the cost metrics include cut frequency, segment inertia, and sum of quality stream over the next section.

By specifying a low cut frequency (DELTA_MIN) the system encourages fast cuts and conversely a high DELTA_MIN would lead to a slow cut sequence.

The inertia weight is how costly it is to break out of the current state if it has been in the state for <DELTA_MIN. The break weight is how much to encourage a switch after the DELTA_MIN is reached. Both are zero at DELTA_MIN and increase with time either side of this point. In other words, cut frequency is important but does not override cuts prior to the break point indicated by the cut frequency nor does it prevent the avoidance of switching after the break point.

The fuzzy logic inherent in the Viterbi decoding allows the system to delay decisions about switching for as long as possible until the system has more information on which to make the choice, trying out several approaches before deciding without using multiple passes.

Graph 1104 represents a processed quality score. Regions are now more contiguous, and there is a boost to movement regions, spiked regions, and the like.

Switching Decisions

Additional factors and metrics can be used to aid in determining cut points. For example, erratic or overly emphatic motion in the camera is generally non-ideal so a more stable camera view could be selected. This approach has particular merit as the motion vectors for the scene are already being generated during the encoding stage of the general pipeline.

Once the camera motion is accounted for, any additional motion will be due to in-scene activity. Selecting views with high activity might ensure that interesting events are not missed. Favouring views with high activity in traditional composition regions such as the centre of the image or that utilise the rule of thirds allow the system to choose the views that are aesthetically pleasing.

If possible, the system may be able to identify scenes. Cuts might be prevented in a scene to preserve dramatic integrity. Other metrics such as image brightness, or scene similarity, might be used as a weighting factor to reduce jarring between cuts.

Generating Composite Videos

Figure 14:
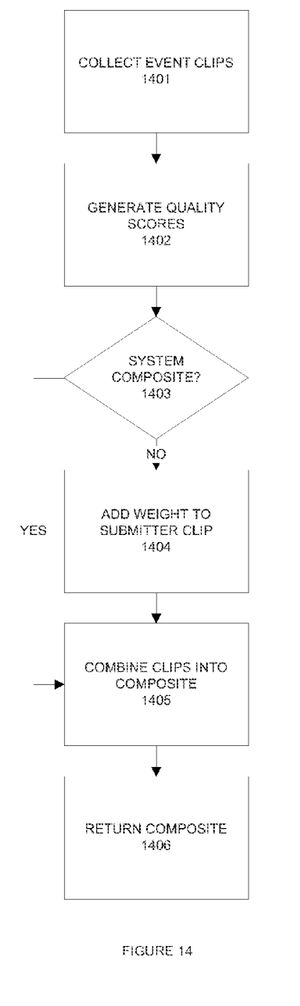
FIG. 14 is a flow diagram illustrating the automatic editing of composite clips in an embodiment of the system.

FIG. 14 is a flow diagram illustrating the automatic editing of content clips in an embodiment of the system. At step 1401 the system collects clips associated with an event. At step 1402 the system generates Quality Scores for each clip as described above. At decision block 1403 it is determined if the composite video is to be a system composite or a submitter composite video. In one embodiment the system will generate a different composite video for each submitter, with weighting applied to the submitter's clips to ensure that a greater percentage of the submitter's content is used than might otherwise occur. For a system composite video, the system applies rules and are agnostic with respect to any particular submitter.

If the video is not a system composite video at step 1403, the system proceeds to step 1404 and adds an additional weight factor to the submitter's clip to increase its likely use in a composite video. After step 1404, or if the composite video is a system video at step 1403, the system combines the clips into a composite video using the quality scores and weighting described above. At step 1406, the system returns the composite video as appropriate.

Balancing Operation

Figure 15:
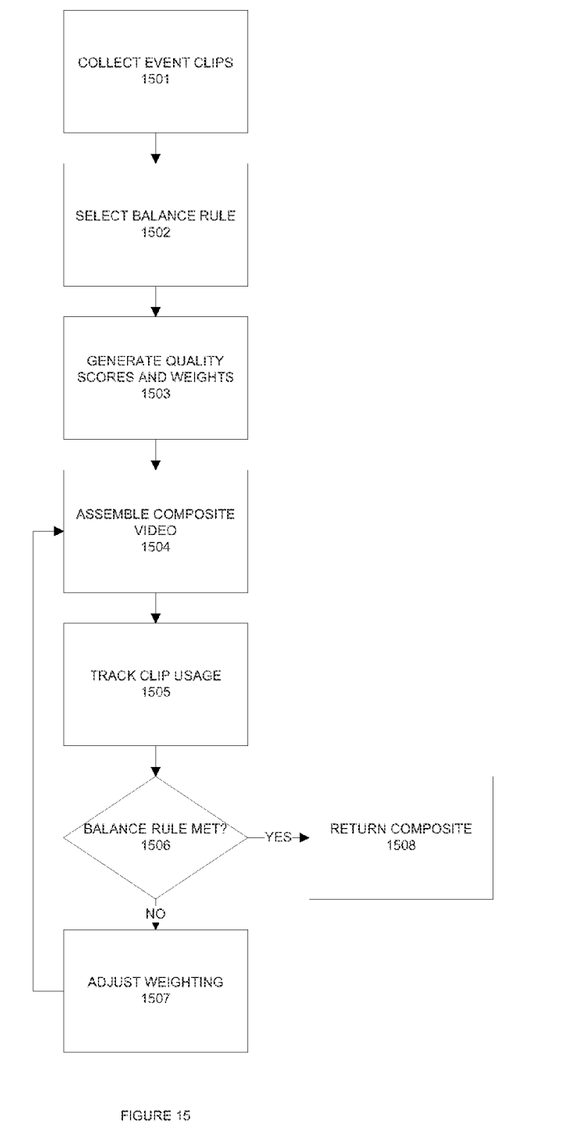
FIG. 15 is a flow diagram illustrating the application of a balancing operation to the generation of a composite video in an embodiment of the system.

In one embodiment the system attempts to apply a fairness or balancing operation to the content clips to make sure that at least some content from each clip is used at least once. FIG. 15 is a flow diagram illustrating an embodiment of the balancing operation.

The embodiment described with respect to FIG. 15 is a multi-pass approach that allows the system to track the use of all available clips and to converge on a composite video that provides a balancing of sources pursuant to defined metrics. At step 1501 the system collects the clips associated with an event. At step 1502 the system selects the balancing rule that will be applied to the composite video. The balancing rules can be any of a number of rules to satisfy desired metrics. For example, in one embodiment, the balancing rule can require that at least some time period of each clip is used in the composite video. Thus, if there are 100 available clips, each clip is used for at least some time period (e.g. 2-3 seconds).

In another embodiment, the system may require that an amount of each clip be used in proportion to the number of submitted clips. For example, if there are 2 clips, then at least one half of each clip must be used in the composite video. If one clip is two minutes and the second is 10 minutes, at least one minute of the first clip and at least five minutes of the second clip must be used. This approach can, in some cases, be combined with the prior rule. For example, if a clip has a duration that is less than the desired time period, then that clip must be used at least in proportion to the number of clips.

The embodiments set minimums for clip use but do not necessarily preclude use of longer time periods of the clips as appropriate and in support of other desires and metrics. For example, the system may provide a bias for the highest quality clips to provide a better composite video. In that case, as long as each clip is used in the minimum amount, the highest quality clips may be used up to their entirety as appropriate.

At Step 1503 the system generates quality scores and adjusts weights as appropriate based on the selected balancing rule (as well as any other requirements the system may have). At step 1504 the system assembles the composite video and tracks the usage of each clip at step 1505. This tracking will note if a clip has been used and how much of the clip has been used.

At decision block the system determines if the selected balance rule has been met. This entails reviewing the tracked usage data and determining if each clip has been used and in the proper amount. If the balance rule has been satisfied, the system returns the composite video at step 1508.

If the balance rule has not been met at step 1506, the system proceeds to step 1507 and adjusts the weighting of each clip as appropriate to ensure clip usage and appropriate length of clip usage. The system then returns to step 1504 to undertake the next pass of assembling the composite video.

Weighting Adjustment

The weighting adjustment attempts to maximize quality as much as possible while still satisfying the balance rules. For example, in the adjustment operation, the system will analyze each unused or underused clip. In some instances, the quality of an unused clip may vary over the length of the clip. The user may have had excessive shaking during one or more portions of the clip. The system uses the generated scores and phone motion detection values generated using the system of FIG. 10 to identify the most stable regions of the unused clip and weights those portions to be used over the less stable portions.

In addition, the unused clips may have higher scoring regions (e.g. where more activity is occurring) and those portions may be weighted for selection in the next pass of generating a composite video.

Similarly, when a used clip must be cut to make room for unused clips, the system may identify the lowest quality sections of the used clip for removal in the second pass, if possible.

In other instances, the system may attempt to avoid excessive edits and cuts as much as possible. Therefore the selection of unused clips may be impacted by this condition.

Dialog Mode

Figure 16:
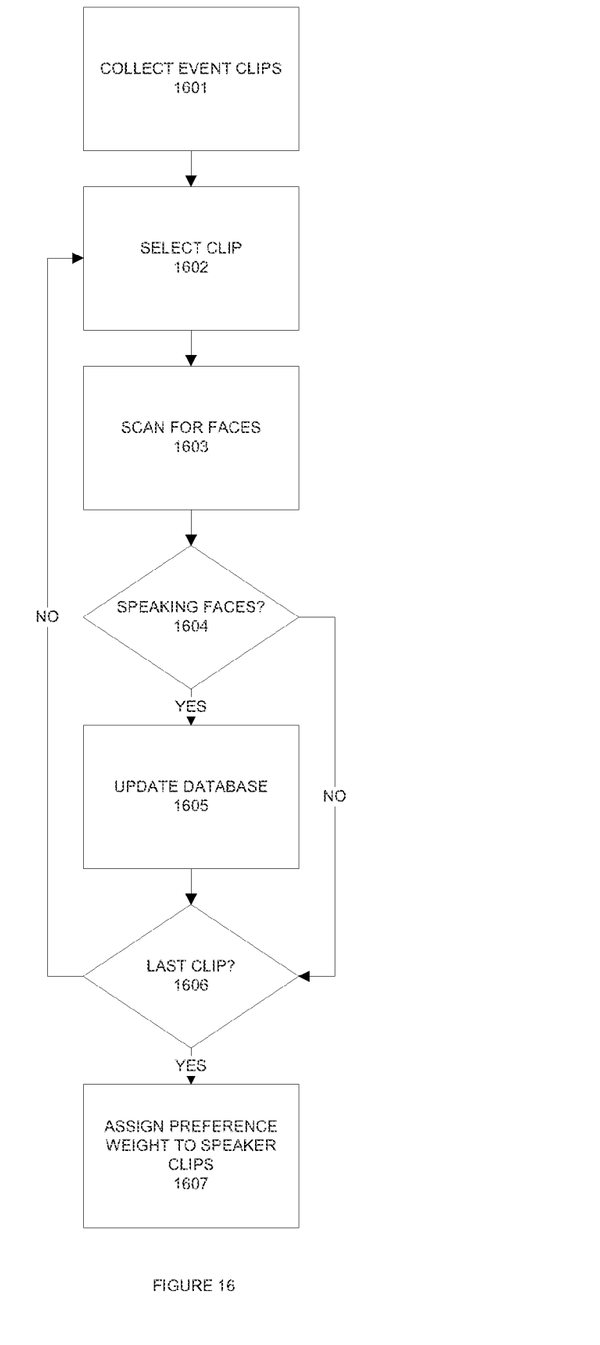
FIG. 16 is a flow diagram illustrating the automatic editing of a composite video based on a dialog mode.

FIG. 16 is a flow diagram illustrating the automatic editing of a composite video based on a dialog mode. In one embodiment, the system uses facial recognition to identify one or more speakers (or singers) in clips associated with an event. If the system is in dialog mode, any clips that show the current speaker will have precedence over other clips. At step 1601 the system assembles event clips. At step 1602 the system selects one of the clips for analysis.

At step 1603 the system scans the clip for faces using facial recognition techniques. The initial identification of faces may be a low resolution approach. If there are faces present the system then checks to see if any of the faces are "speaking faces". This may be accomplished by a higher resolution operation to identify the lip region of an identified face and determining if the lips are moving in some sort of synchronization of the available audio track. The system may also use audio magnitude as an indicator of possible speaking faces in a clip.

At decision block 1604 the system determines if there were speaking faces in the clip. If so, the system updates a database at step 1605. The database may be a separate database identifying each clip and whether a speaking face is present in the clip. In other embodiments, the metadata associated with a clip includes entries for presence of speaking faces. If there are no speaking faces at step 1604, or after the database update at step 1605, the system determines if there are more clips at decision block 1606. If it is the last clip the system proceeds to step 1607 and assigns priority speaker weight to each clip that contains one or more speaker faces.

If it is not the last clip, the system returns to step 1602 and selects another clip for analysis.

After all of the speaking faces have been identified and the clips have been appropriately weighted, a composite video can be generated that can automatically switch to a clip featuring a speaker so that the viewer can view the speaker as much as possible. If there is more than one clip featuring a speaker, the system can apply other rules, such as fairness and balancing, to determine which clip to use.

Alternate Embodiments

In one embodiment, cutting points could be highlighted based on audio/visual cues. The system may also track whether the user has manually adjusted focus during the filming (using metadata) indicating a potentially high interest sequence. The system may also prioritize stream switching based on camera quality in terms of potential (lens quality, focus etc).

Instead of being temporally linear, the system can include a mode to cut backwards in time to show the same event from multiple angles.

If 3D spatial information is available or determined, the system can implement left to right or right to left cuts to maximize image coverage. The system in a live embodiment may even provide feedback to the users to suggest point of view changes.

Embodiment of Computer Execution Environment
(Hardware)

Figure 17:
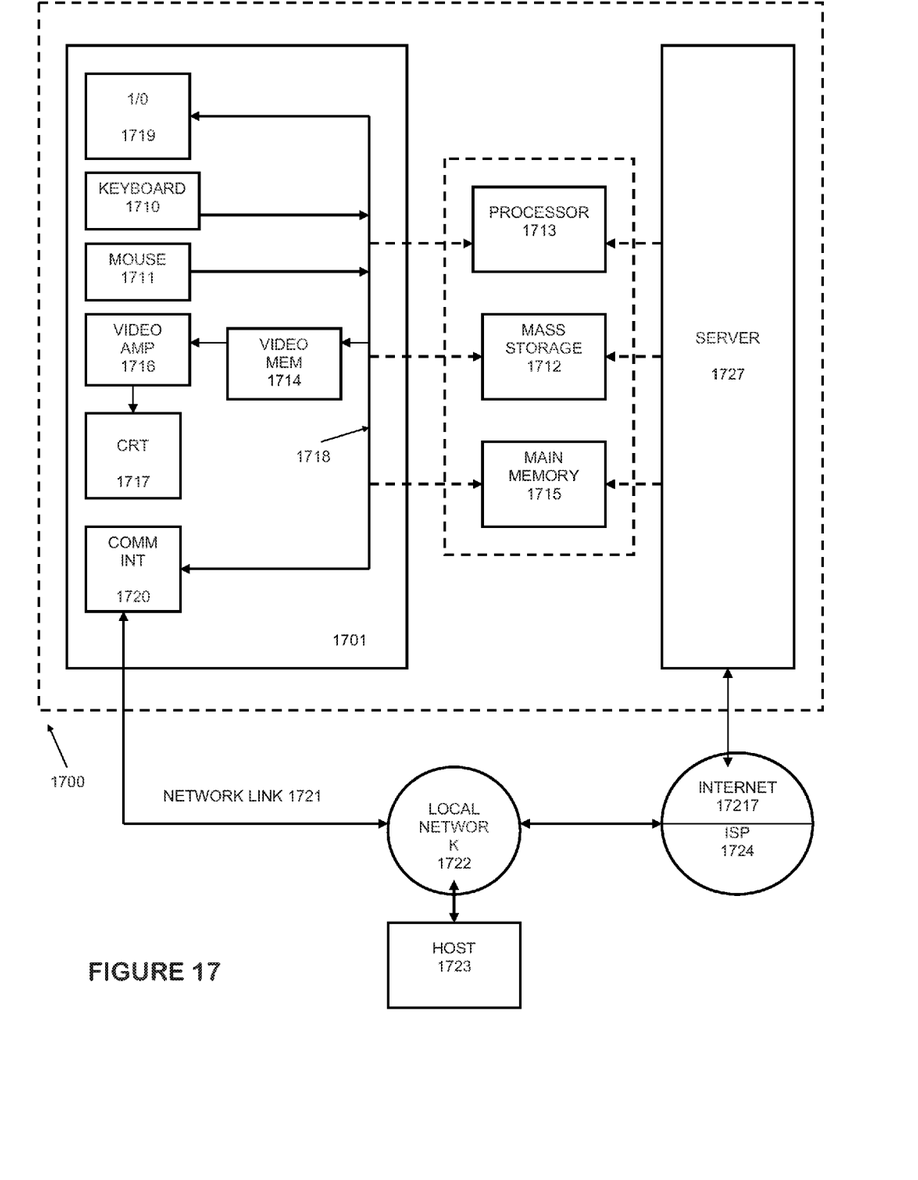
FIG. 17 illustrates an example computer embodiment of the system.

An embodiment of the system can be implemented as computer software in the form of computer readable program code executed in a general purpose computing environment such as environment 1700 illustrated in FIG. 17, or in the form of bytecode class files executable within a Java™ run time environment running in such an environment, or in the form of bytecodes running on a processor (or devices enabled to process bytecodes) existing in a distributed environment (e.g., one or more processors on a network). A keyboard 1710 and mouse 1711 are coupled to a system bus 1718. The keyboard and mouse are for introducing user input to the computer system and communicating that user input to central processing unit (CPU 1713. Other suitable input devices may be used in addition to, or in place of, the mouse 1711 and keyboard 1710. I/O (input/output) unit 1719 coupled to bi-directional system bus 1718 represents such I/O elements as a printer, A/V (audio/video) I/O, etc.

Computer 1701 may be a laptop, desktop, tablet, smartphone, or other processing device and may include a communication interface 1720 coupled to bus 1718. Communication interface 1720 provides a two-way data communication coupling via a network link 1721 to a local network 1722. For example, if communication interface 1720 is an integrated services digital network (ISDN) card or a modem, communication interface 1720 provides a data communication connection to the corresponding type of telephone line, which comprises part of network link 1721. If communication interface 1720 is a local area network (LAN) card, communication interface 1720 provides a data communication connection via network link 1721 to a compatible LAN. Wireless links are also possible. In any such implementation, communication interface 1720 sends and receives electrical, electromagnetic or optical signals which carry digital data streams representing various types of information.

Network link 1721 typically provides data communication through one or more networks to other data devices. For example, network link 1721 may provide a connection through local network 1722 to local server computer 1723 or to data equipment operated by ISP 1724. ISP 1724 in turn provides data communication services through the world wide packet data communication network now commonly referred to as the "Internet" 1727 Local network 1722 and Internet 1727 both use electrical, electromagnetic or optical signals which carry digital data streams. The signals through the various networks and the signals on network link 1721 and through communication interface 1720, which carry the digital data to and from computer 1700, are exemplary forms of carrier waves transporting the information.

Processor 1713 may reside wholly on client computer 1701 or wholly on server 1727 or processor 1713 may have its computational power distributed between computer 1701 and server 1727. Server 1727 symbolically is represented in FIG. 17 as one unit, but server 1727 can also be distributed between multiple "tiers". In one embodiment, server 1727 comprises a middle and back tier where application logic executes in the middle tier and persistent data is obtained in the back tier. In the case where processor 1713 resides wholly on server 1727, the results of the computations performed by processor 1713 are transmitted to computer 1701 via Internet 1727, Internet Service Provider (ISP) 1724, local network 1722 and communication interface 1720. In this way, computer 1701 is able to display the results of the computation to a user in the form of output.

Computer 1701 includes a video memory 1714, main memory 1715 and mass storage 1712, all coupled to bi-directional system bus 1718 along with keyboard 1710, mouse 1711 and processor 1713.

As with processor 1713, in various computing environments, main memory 1715 and mass storage 1712, can reside wholly on server 1727 or computer 1701, or they may be distributed between the two. Examples of systems where processor 1713, main memory 1715, and mass storage 1712 are distributed between computer 1701 and server 1727 include thin-client computing architectures and other personal digital assistants, Internet ready cellular phones and other Internet computing devices, and in platform independent computing environments;

The mass storage 1712 may include both fixed and removable media, such as magnetic, optical or magnetic optical storage systems or any other available mass storage technology. The mass storage may be implemented as a RAID array or any other suitable storage means. Bus 1718 may contain, for example, thirty-two address lines for addressing video memory 1714 or main memory 1715. The system bus 1718 also includes, for example, a 32-bit data bus for transferring data between and among the components, such as processor 1713, main memory 1715, video memory 1714 and mass storage 1712. Alternatively, multiplex data/address lines may be used instead of separate data and address lines.

In one embodiment of the invention, the processor 1713 is a microprocessor such as manufactured by Intel, AMD, Sun, etc. However, any other suitable microprocessor or microcomputer may be utilized, including a cloud computing solution. Main memory 1715 is comprised of dynamic random access memory (DRAM). Video memory 1714 is a dual-ported video random access memory. One port of the video memory 1714 is coupled to video amplifier 1719. The video amplifier 1719 is used to drive the cathode ray tube (CRT) raster monitor 1717. Video amplifier 1719 is well known in the art and may be implemented by any suitable apparatus. This circuitry converts pixel data stored in video memory 1714 to a raster signal suitable for use by monitor 1717. Monitor 1717 is a type of monitor suitable for displaying graphic images.

Computer 1701 can send messages and receive data, including program code, through the network(s), network link 1721, and communication interface 1720. In the Internet example, remote server computer 1727 might transmit a requested code for an application program through Internet 1727, ISP 1724, local network 1722 and communication interface 1720. The received code maybe executed by processor 1713 as it is received, and/or stored in mass storage 1712, or other non-volatile storage for later execution. The storage may be local or cloud storage. In this manner, computer 1700 may obtain application code in the form of a carrier wave. Alternatively, remote server computer 1727 may execute applications using processor 1713, and utilize mass storage 1712, and/or video memory 1715. The results of the execution at server 1727 are then transmitted through Internet 1727, ISP 1724, local network 1722 and communication interface 1720. In this example, computer 1701 performs only input and output functions.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. In other embodiments, the system may be implemented on any suitable computing environment including personal computing devices, smart-phones, pad computers, and the like. An embodiment of the invention may be implemented in any type of computer system or programming or processing environment.

What is claimed is:

1. A method of automatically editing a plurality of content clips comprising:
   in a processing system,
   analyzing each content clip and calculating a quality score based on the presence of interesting feature points; wherein the quality score is a combination of a first stage comprising camera characteristics and a second stage comprising positive and negative characteristics;
   selecting a portion of a content clip for a composite video based on the quality score of the content clip.

2. The method of claim 1 wherein the quality score is calculated on a frame basis of each content clip.

3. The method of claim 2 wherein the quality score is calculated for every frame of a content clip.

4. The method of claim 2 wherein the quality score is calculated for every nth frame of a content clip.

5. The method of claim 4 wherein n equals 3.

6. The method of claim 2 further including converting each frame to a thumbnail prior to calculating the quality score.

7. The method of claim 6 wherein the quality score is calculated for every thumbnail frame.

8. The method of claim 6 wherein the quality score is calculated for every nth thumbnail frame.

9. The method of claim 8 wherein n equals 3.

10. The method of claim 1 wherein the interesting feature points are those that have the greatest relative movement between frames of a content clip.

11. The method of claim 10 further including assembling the content clips so that at least a portion of each clip is used in the composite video.

12. The method of claim 11 further including defining a minimum amount of each clip that is used in the composite video.

* * * * *